United States Patent [19]
White et al.

[11] Patent Number: 5,750,954
[45] Date of Patent: May 12, 1998

[54] WATER EXCLUSION DEVICE FOR UNDERWATER WELDING

[75] Inventors: Raymond Alan White, Schenectady; Harvey Donald Solomon, Niskayuna, both of N.Y.

[73] Assignee: General Electric Company, Schenectady, N.Y.

[21] Appl. No.: 724,592

[22] Filed: Sep. 30, 1996

[51] Int. Cl.[6] .................................................. B23K 10/00
[52] U.S. Cl. .................. 219/121.45; 219/72; 219/121.51; 219/121.43
[58] Field of Search .................... 219/72–75, 137 R, 219/121.45, 121.46, 121.43, 121.51, 121.49, 121.59; 228/101

[56] References Cited

U.S. PATENT DOCUMENTS

| 3,898,418 | 8/1975 | Hasui .................................... 219/75 |
| 4,039,798 | 8/1977 | Lythall et al. ........................ 219/72 |
| 4,052,632 | 10/1977 | Sagara et al. .................... 219/137 R |
| 4,172,974 | 10/1979 | Stingelin et al. ................... 219/72 |
| 4,659,898 | 4/1987 | Spiegelman et al. ............. 219/117.1 |
| 4,816,637 | 3/1989 | Sanders et al. ................... 219/121.59 |

*Primary Examiner*—Mark H. Paschall
*Attorney, Agent, or Firm*—Ernest G. Cusick; William H. Pittman

[57] ABSTRACT

A water exclusion device for underwater arc welding comprises a chamber having flexible gas permeable surface contact member at the lower end. A wire mesh material is the preferred gas permeable material.

11 Claims, 4 Drawing Sheets

WATER EXCLUSION DEVICE FOR UNDERWATER WELDING

This invention is directed to underwater welding and more particularly to an apparatus for underwater plasma arc welding apparatus which includes a water exclusion device carried on the nozzle of the welding torch.

BACKGROUND OF THE INVENTION

Thermal welding involves local heating of the joint between the two sections that one wishes to join and this causes local melting of the joint and any filler metal that is added to the joint. The weld results from the solidification of this melted material. This local heating not only causes local melting, it also causes an expansion of the metals that are adjacent to the weld pool. This expansion is followed by contraction that occurs during cooling. The temperature gradient that is inherent in welding thus leads to a gradient in the thermal strain and this leads to the development of the residual stresses. These stresses are termed residual because they are present as a residual to the welding operation. They are internal to the materials being welded, i.e., no external tractions are required. These stresses are present in the solidified weld metal and in the heat affected zone (HAZ) which surrounds the weld. In conventional welds, these stresses are generally tensile within the weld and HAZ. They generally become compressive further from the weld, but the magnitude of the compressive stress is generally less than the magnitude of the tensile stress. The overall forces must balance, with this being accomplished by higher local tensile stresses being balanced by compressive stresses which are lower in magnitude, but extend over a larger volume.

The magnitude and distribution of these residual stresses are determined by the heat added to the weld, the geometry of the sections being welded, the thermal properties of the materials being welded, and the heat transfer out of the weld and HAZ. The exact thermal gradient depends upon the balance of the heat input due to the welding and the rate at which this heat is removed. The boundary condition that is considered in conventional welding assumes that this heat is removed by conduction into the cooler volumes of surrounding metal i.e., those volumes that are further from the weld of the materials being welded.

Relatively little heat is removed by radiation from the weld and HAZ, or by conduction through the gas which contacts the external surface of the weld and HAZ. The invention being disclosed here alters this, causing relatively large compressive residual stresses to be developed within the weld and HAZ. This can be done by performing the welding underwater or some other medium which can be used to quench the weld and HAZ. The water now acts as a conduction medium which very efficiently removes heat from the surface of the weld and HAZ. This altered heat flow results in the development of compressive stresses in the weld and HAZ. This is important because the development of these compressive stresses can prevent hot cracking or He cracking which develops as the weld cools, or stress corrosion cracking which occurs subsequent to the welding, when the weld and HAZ are exposed to conditions which tend to promote such cracking.

Hot cracking results from the action of tensile stresses on the solidifying weld. A weld generally does not solidify at a single defined temperature. Rather, unless one is dealing with an ultra pure single element or single compound material, the solidification occurs over a temperature range. As solidification occurs, the contraction which develops during solidification or that due to the decrease in temperature, causes stresses to be developed. When these stresses act on solidifying material they cause hot cracks to develop. This is because the liquid that is present cannot support a tensile stress. This cracking can be prevented if compressive rather than tensile stresses are developed.

Helium embrittlement also occurs due to the action of tensile stresses which are developed during cooling, and it can also be prevented if compressive stresses rather than tensile stresses are developed. Helium embrittlement results from the development of internal helium, which is produced by the nuclear radiation. This phenomena prevents successful repair welding on irradiated materials. The development of compressive stresses makes these repairs possible.

The development of compressive residual stresses can also act to mitigate stress corrosion cracking (SCC). As its name implies, stress corrosion cracking requires the action of stress, and residual stress can be an important source of these stresses. SCC develops after welding, when the weld and HAZ are exposed to an appropriate media. It can be prevented if tensile stresses are prevented from acting in the presence of this media. Thus, the tendency for SCC can be minimized if compressive rather than tensile residual stresses are developed.

It has now been found that the plasma transferred arc welding repair of stress corrosion cracking damage in water exposed portions of nuclear reactors and similar devices and structures can be achieved by carrying out the welding process underwater. The welding process comprises establishing the requisite conditions, forming a weld pool of molten metal, cooling the weld pool to form a metallurgical bond between adjacent unmelted zones, and quenching the weld to an ambient temperature below the melting range. The weld pool can be formed from a compatible alloy filler metal supplied in the powder or wire form or autogenously from the substrate being repaired. Contact of the cooling weld pool with the ambient water provides heat flow characteristics which reduce tensile stresses and promotes the development of compressive stresses.

SUMMARY OF THE INVENTION

This invention provides an underwater plasma transferred arc welding method and apparatus in which the nozzle of the welding torch or the associated gas lens is provided with an adjustably mounted device which functions to exclude water from the arc and facilitates establishment of the arc at substantial depths.

In the operation of a plasma transferred arc welding apparatus, the arc passes between the nozzle at the end of the torch and the grounded workpiece by displacing the water either by the action of the shielding gas or operating in a zone or chamber from which the water is excluded by a combination of mechanical exclusion and gas pressure within the mechanical device. At shallow depths increased gas flow rate may be sufficient to maintain a water-free zone. At greater depths the arc can not be established in the presence of gas flow rates which are high enough to displace the water and form a water-free zone.

DESCRIPTION OF THE INVENTION

It is clear that there are numerous benefits that result from the development of compressive rather than tensile residual stresses, and this invention produces these favorable stresses. These stresses are developed when welding is done underwater, with the use of a local exclusion device which keeps the water away from the molten weld pool. When the welding torch moves, it uncovers the weld, which by this time has solidified. Nonetheless, the heat transfer away form the weld and HAZ is altered by making the weld underwater, and this causes the development of the compressive stresses.

This underwater welding can be done at shallow or deep depths because the exclusion device is pressurized to just above the ambient pressure. The benefit can be achieved with or without the use of filler metal. Conventional filler metal can be used or special filler metal which mitigates hot cracking, helium embrittlement or stress corrosion cracking.

It has now been found that plasma transfer arc welding (PTA) can be used underwater to develop compressive stresses and thereby prevent hot cracking, He embrittlement, and mitigate SCC. An exclusion device was used which was pressurized to a level equivalent to 80 feet of water. This is done to enable repair welds to be made in a nuclear reactor without the necessity for the water being drained which would require the removal of the nuclear fuel and the use of shielding to replace the shielding effect of the water. Welding requires the proper establishment of a weld pool, proper bonding of the weld pool and materials to be joined and crack free solidification of the weld pool. To do this underwater requires the use of a local exclusion device to keep the water away for the molten weld pool while in the liquid state. This weld pool can be formed autogenously for the materials being joined or with filler metal, which can be introduced into the weld pool from powder or wire, or as sheet or wire laid down in the joint prior to welding.

The method of this invention employs fusion welding or cladding technique to reduce tensile stresses and develop formation of residual compressive stresses in the melted and resolidified metal and adjacent heat affected zone of the material being treated. In the practice of the invention, a local molten weld pool is formed by a suitable heat source such as a welding torch within a protected exclusion zone from which the ambient environment is excluded. The exclusion device is attached to and moves with the torch or other heat supplying apparatus. As the torch and exclusion device move along the path, the weld pool begins to cool and as it passes out of the protected zone the weld is exposed to the ambient environment which acts as a quenching medium. The quenching medium rapidly cools the top surface of the weld and the heat affected zone of the material being treated. Heat is removed from the fused weld and surrounding material by conduction via the quenching medium rather than by convection as in conventional air welding. Some heat is dissipated by heat flow within the bulk material being treated. However, the major heat flow for the method of this invention is through the quench medium. The effect of this heat flow phenomenon is the formation of compressive stress in the weld and nearby heat affected zone.

Broadly this invention includes underwater welding apparatus comprising a welding torch having a nozzle adapted to deliver heat to a workpiece to form a weld pool, said nozzle having a water exclusion device mounted on the nozzle and having a gas permeable skirt on the lower end thereof in contact with the workpiece, and means for providing gas under pressure to the water exclusion device from the nozzle of the torch.

The water exclusion device of the invention comprises a tubular body, an annular gas permeable flexible member mounted congruently on one end of the tubular body, and a spacer device in contact with the other end of said tubular body.

DETAILED DESCRIPTION OF DRAWINGS

The water exclusion device of this invention will be more clearly understood when considered in the context of underwater plasma arc welding as illustrated in the accompanying drawings.

Figure 1:
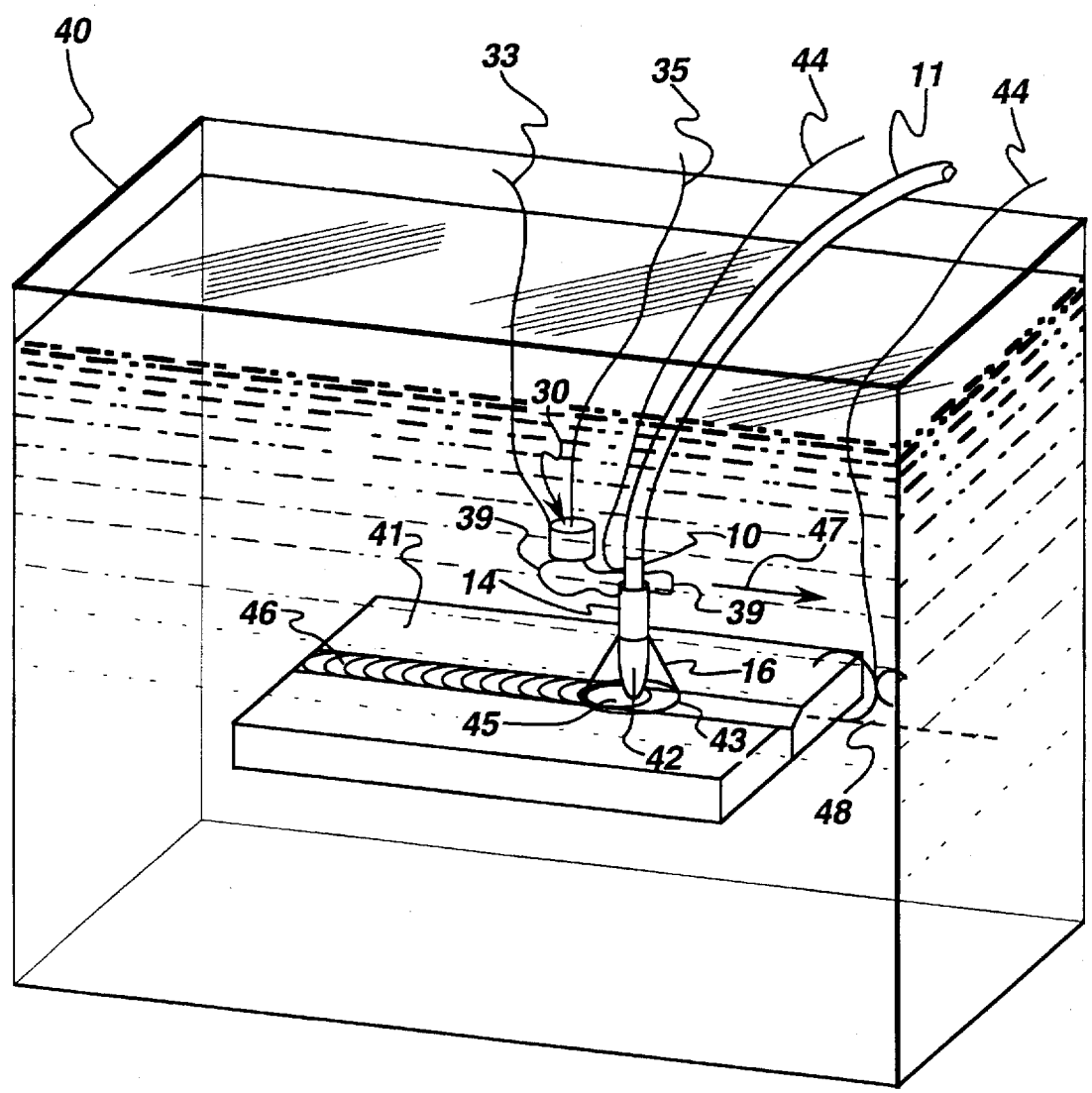
FIG. 1 is a schematic illustration of underwater welding.

FIG. 1 illustrates the making of a weld under conditions which generate residual compressive forces and reduce hot cracking, helium cracking, and stress corrosion cracking. The submerged welding is schematically depicted by a fluid-containing tank 40. The torch 10 with gas supply line 11, gas lens 14, and exclusion device 16 are shown assembled and located adjacent the surface of workpiece 41 at which the weld is to be made. Plasma 42 extends to that surface. The tank can be pressurized to simulate varying depths. As illustrated in FIG. 1, filler weld material in the form of powder is supplied through hose 35 to distribution means 30. Bled off transport gas is exhausted through hose 33 after pressure and flow regulation and powder separation. Powdered weld material is transported to torch 10 through hoses 39. Electrical power is supplied to the torch 10 and workpiece 41 through electrical connections 44.

To make a weld, inert gas is supplied through hose 11 to develop an exclusion region and an arc is struck in torch 10 which supplies heat to surface 41 and develops a pool of molten metal 45 to which powdered weld material is supplied through hoses 39. The torch is moved in the direction indicated by arrow 47 with the weld pool 45 trailing behind the plasma 42.

Figure 2:
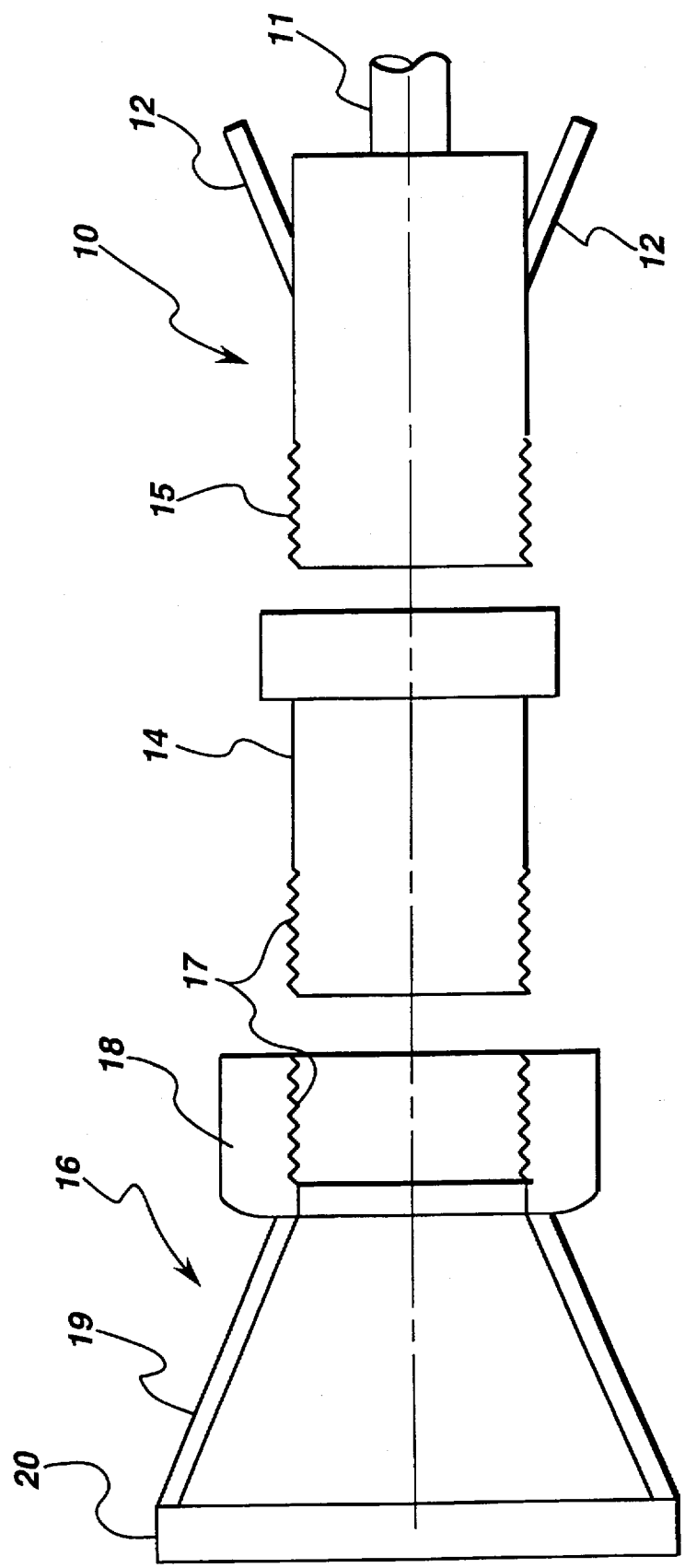
FIG. 2 is a cross-sectional view of a torch and liquid exclusion device providing a liquid exclusion zone.

Referring now to FIG. 2, PTA torch 10 includes electrodes, not shown, to which a voltage and current appropriate to the maintenance of a welding arc and a gas inlet 11 to receive a flow of gas which is intended to serve to regulate the plasma developed by the arc. This gas is generally divided into a so-called plasma center gas flow around the central electrode for supplying gas to the plasma and a so-called shielding gas flow which is normally intended to prevent oxidation of the weld pool and HAZ, and to displace ambient gases or liquids. These gas flows are modified and directed in the immediate vicinity of the arc plasma by a gas lens 14. The gas lens is provided with threads (not shown) which mate with threads 15 on the PTA torch 10 for facility of replacement and interchange. Welding filler materials in the form of a powder may be introduced into the torch at inlets 12.

The exclusion device 16, as illustrated in FIG. 2, is thread mounted on the gas lens or torch with mating threads 17 formed on a mounting collar portion 18. The body 19 of the exclusion device 16 is illustrated as a tube having a flared lower end but generally the device is constructed as a cylinder of regular dimensions. Solidification of the weld should begin inside the exclusion region provided by the exclusion device. The use of a flared tube can be useful for providing a larger area of surface from which water is excluded without unduly enlarging the cavity and therefore the diameter of the device.

A flexible surface-contacting skirt 26 which may be of woven metal is provided at the bottom end of the exclusion device to provide compliance to the workpiece surface and weld bead or cladding overlay as the weld is made and to provide for escape of gas. Skirt 20 may be fabricated of wire or fibers which can be woven or fitted and which provide compliance with the surface of the workpiece and weld. The escape of gases though the apertures in the skirt displaces liquids which would otherwise be forced into the exclusion device by hydrostatic pressure. The confinement of the gas by exclusion device 16 allows the exclusion zone to be maintained with reduced gas flow volume by maintaining a pressure in excess of the ambient hydrostatic pressure. While the exclusion region can be maintained by a combination of the plasma center gas and the shielding gas, possibly supplemented to some degree by the powder carrier or transport gas, a separate gas supply can be provided for the exclusion device itself. While use with a PTA torch is described, the exclusion device can be used with any heat source including oxy-acetylene and carbon arc torches and tungsten inert gas torches, and gas metal arc torches as well as plasma torches described above. The method of the invention may be practiced using conventional welding rods, by continuous feed of welding alloy in wire or powder form or by forming the weld pool autogenously from the substrates or bodies to be welded together.

Figure 3:
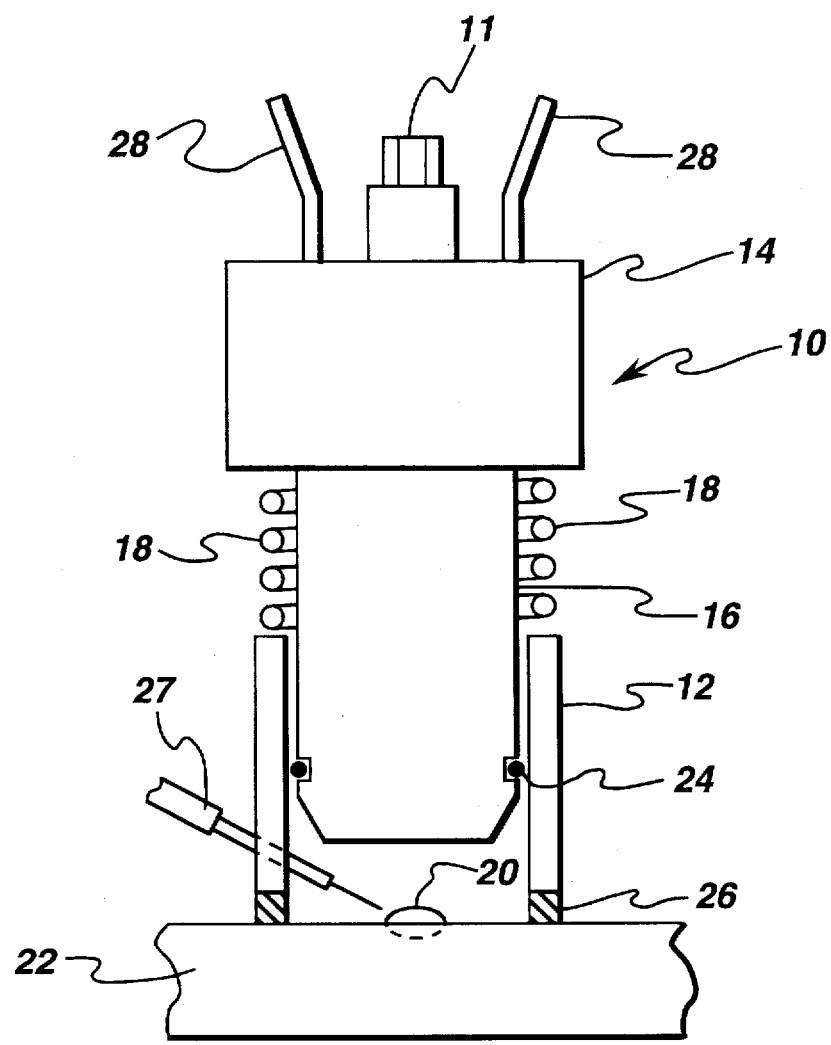
FIG. 3 is a cross section view of a plasma transferred arc welding torch with an adjustable water exclusion device mounted on the gas lens.

FIG. 3 illustrates a PTA torch 10 which has an adjustable water exclusion device 12 slidably mounted on gas lens 16. This device, as shown, is adapted to use both powder and wire filler materials. If no filler material is used, the weld can be formed autogenously with metal from the workpiece. This apparatus comprises torch body 14 which is provided with central electrode 11, powder inlet tubes 28 and gas inlets and cooling water inlets, not shown. The torch assembly is provided with gas lens 16 and spacer spring 18 for urging water exclusion device 12 into contact with substrate or workpiece 22 on which the weld bead 20 is formed.

Water exclusion device 12 is a cylindrical metal tube or sleeve which slides over gas lens 16 as permitted by coil spring 18. The gas lens is provided with o-ring 24 to form a water resistant seal above the plasma zone within the water exclusion device. The lower end of the water exclusion device is provided with a gas permeable wire mesh skirt 26 which can be secured in place on the device by some adhesion means such a series of spot welds. The water-free exclusion zone within the cavity of the device in which the plasma is formed and operates is provided by gas pressure within device 12. Pressure is maintained at the desired level by control of gas volume supplied by the torch gas supply. As gas seeps out through the mesh, water is prevented from flooding into the cavity of the water exclusion device. The use of a mesh allows the internal gas to escape as small bubbles instead of large ones. The bubbles produce pressure pulses which disturb the welding and are thus undesirable.

Water exclusion device 12 is illustrated as having a wire feed tube 27 for situations in which filler metal is delivered to the weld pool in the form of wire, strip, or rod.

Figure 4:
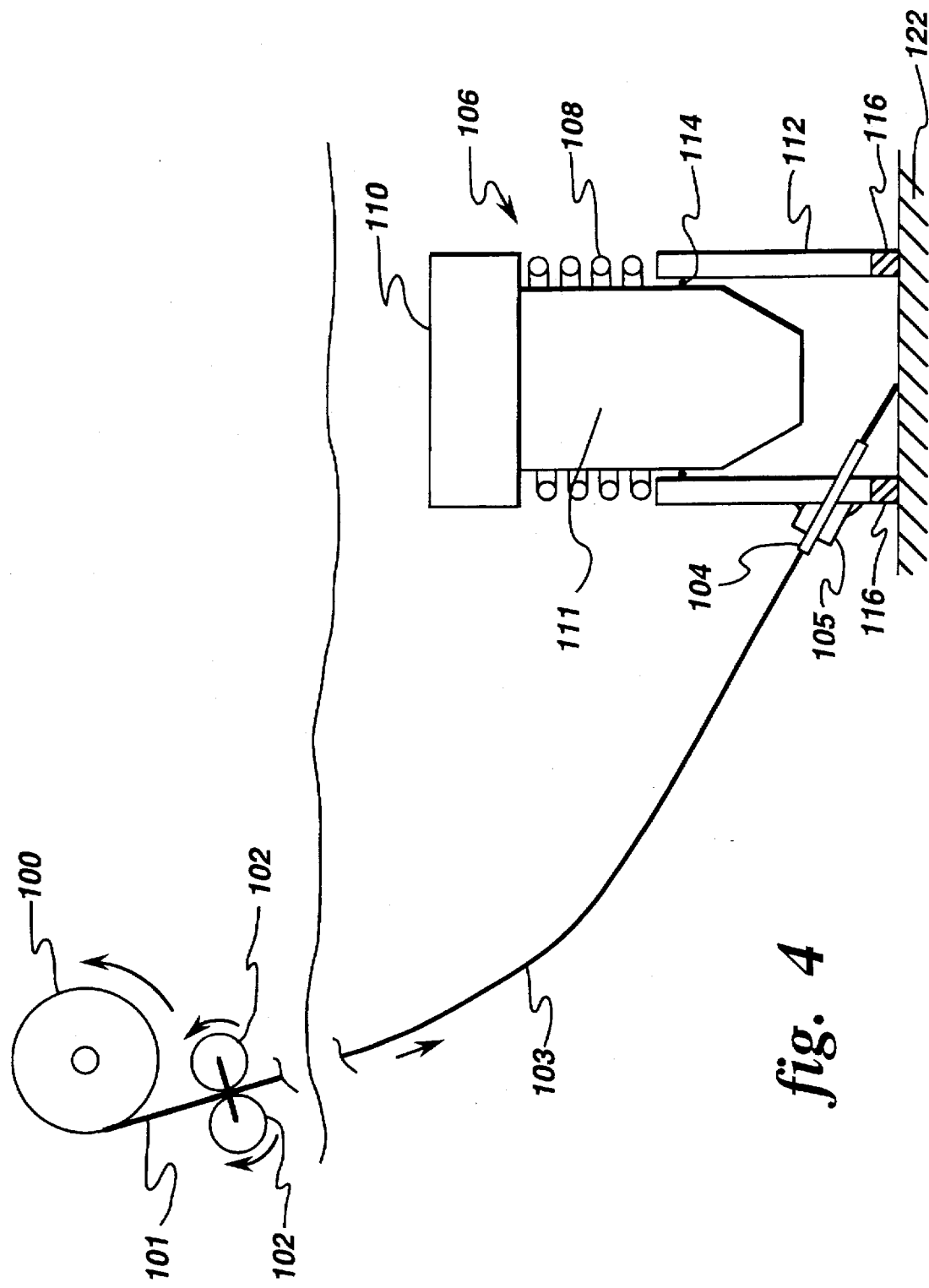
FIG. 4 is a schematic drawing of a wire-fed underwater plasma transfer arc system including the water exclusion device of this invention.

FIG. 4 is a schematic representation of a wire fed underwater welding apparatus 106 comprising a torch 110, water exclusion device 112 positioning means 108, shown as a coil spring, and o-ring seal 114. Exclusion device 112 is provided with surface compliant skirt 116 and wire feed fitting 105 and guide tube 104.

Wire is supplied from spool 100 which is located above the surface of the water through flexible tube 103 by feed rollers 102. Tube 103 passes into the water free cavity of the water exclusion device and into contact with the surface of workpiece 122 through guide tube 104. Filler wire passes into the water filler cavity of the water exclusion device and into contact with the surface of the workpiece 122 through guide tube 104.

What is claimed:

1. Underwater welding apparatus comprising a welding torch having a nozzle adapted to deliver heat to a workpiece to form a weld pool, said nozzle having a water exclusion device mounted on the nozzle, the water exclusion device comprising a lower end and a gas permeable skirt on the lower end in contact with the workpiece, at least one spring for biasing the water exclusion device toward the workpiece, and means for providing gas under pressure to the water exclusion device from the nozzle of the torch.

2. An underwater plasma arc welding apparatus comprising a plasma arc welding torch, means for supplying power to the torch, means for supplying gas to the torch, a gas lens mounted on the nozzle of said torch, a tubular water exclusion device slidably mounted on the lower portion of the gas lens said device having a gas permeable flexible member attached to the device for compliant contact with a workpiecepiece, positioning means on the gas lens in contact with the upper end of said device for resiliently urging the device towards the workpiecepiece.

3. A water exclusion device comprising a tubular body, a gas permeable flexible member mounted on an end of the tubular body, and at least one spacer spring in contact with the other end of said tubular body.

4. The device of claim 1 in which the at least one spacer spring comprises a compressible tension spring and the flexible member comprises a body of metal mesh.

5. The device of claim 4 wherein the compressible tension spring comprises a coil spring.

6. The apparatus of claim 2, wherein the positioning means for resiliently urging the device comprises a compressible tension spring.

7. The apparatus of claim 6, wherein the compressible tension spring comprises a coil spring.

8. The apparatus of claim 2, wherein the gas permeable flexible member comprises a body of metal mesh.

9. The device of claim 3, wherein the at least one spacer spring comprises a compressible tension spring.

10. The device of claim 9, the compressible tension spring comprising a coil spring.

11. The device of claim 3, wherein the gas permeable flexible member comprises a body of metal mesh.

* * * * *